United States Patent
Syed et al.

(10) Patent No.: US 6,591,099 B1
(45) Date of Patent: Jul. 8, 2003

(54) METHOD AND SYSTEM FOR TRANSFERRING INFORMATION TO A POST PROCESSING SUBSYSTEM OUTSIDE THE WIRELESS NETWORK

(75) Inventors: Inayat Syed, Fairfax, VA (US); Yapping Zhu, Paris (FR); Nauman Shakil, Fairfax, VA (US); Martin Reichelt, Plano, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/570,855

(22) Filed: May 12, 2000

(51) Int. Cl.⁷ .................................. H04Q 7/20
(52) U.S. Cl. ................. 455/426; 455/426; 455/422; 455/517; 455/433; 455/554; 455/560; 379/211.01
(58) Field of Search ................. 455/426, 422, 455/517, 554, 433, 560; 379/211.01

(56) References Cited

U.S. PATENT DOCUMENTS

| | | | | |
|---|---|---|---|---|
| 1,921 A | * | 12/1840 | Fletcher et al. | 105/115 |
| 5,457,735 A | * | 10/1995 | Erickson | 379/266.01 |
| 5,878,343 A | * | 3/1999 | Robert et al. | 455/424 |
| 6,018,657 A | * | 1/2000 | Kennedy et al. | 455/422 |
| 6,073,018 A | * | 6/2000 | Sallberg | 370/329 |
| 6,167,264 A | * | 12/2000 | Palviainen et al. | 435/445 |
| 6,198,923 B1 | * | 3/2001 | Buettner | 455/425 |
| 6,236,857 B1 | * | 5/2001 | Calabrese et al. | 455/422 |
| 6,363,144 B1 | * | 3/2002 | Becher et al. | 379/211.01 |
| 6,381,459 B1 | * | 4/2002 | Gervens et al. | 370/237 |

* cited by examiner

Primary Examiner—Daniel Hunter
Assistant Examiner—Stephen D'Agosta

(57) ABSTRACT

Within a wireless telecommunications network, a method and system of transferring information from a Mobile Station (MS) 12 in the network 40 transparently to a Post Processing Subsystem (PPSS) 50 outside the network 40. The PPSS 50 requests information about the MS 12 by transmitting a request to the network 40 via an external node 42 coupling the PPSS 50 to the network 40. An element in the network 40 then receives the request from the PPSS 50 and identifies the type of external node 42 from which the request was received. Information is collected about the MS 12 that is responsive to the request. Finally, the information is transmitted in a network message format to the PPSS 50 through the identified external node from which the request was received.

16 Claims, 5 Drawing Sheets

| 8 | 7 | 6 | 5 | 4 | 3 | 2 | 1 | |
|---|---|---|---|---|---|---|---|---|
| Element Identifier ||||||||  Octet 1 |
| Length Indicator |||||||| Octet 2 |
| Post Processing Info - octet 1 |||||||| Octet 3 |
| Post Processing Info - octet 2 |||||||| Octet 4 |
| ... |||||||| ... |
| ... |||||||| ... |
| Post Processing Info - octet N |||||||| Octet N |

FIGURE 3a

| 8 | 7 | 6 | 5 | 4 | 3 | 2 | 1 | |
|---|---|---|---|---|---|---|---|---|
| Element Identifier |||||||| Octet 1 |
| Length Indicator |||||||| Octet 2 |
| Service Provider Region - ID |||||||| Octet 3 |
| Benefit of Doubt Region - ID |||||||| Octet 4 |

FIGURE 3b

<u>ASN.l Formal Description</u>
BillingIndicator ::OCTET STRING (SIZE(2))

| 8 | 7 | 6 | 5 | 4 | 3 | 2 | 1 | |
|---|---|---|---|---|---|---|---|---|
| MSB | | | | | | | LSB | Octet 1 |
| MSB | | | | | | | LSB | Octet 2 |

1st Octet = Service Provider Region - ID

2nd Octet = Benefit of Doubt Region - ID

FIGURE 3c

METHOD AND SYSTEM FOR TRANSFERRING INFORMATION TO A POST PROCESSING SUBSYSTEM OUTSIDE THE WIRELESS NETWORK

TECHNICAL FIELD

This invention relates in general to wireless telecommunication networks and applications and, in particular, to a method and system of transferring information from a Mobile Station (MS), or a Base Station Subsystem (BSS) (i.e., a Base Station Controller and a Base Transceiver Station) in the network transparently to a Post Processing Subsystem (PPSS) outside the network, such as a wireless terrestrial or non-terrestrial element (e.g., satellite).

BACKGROUND OF THE INVENTION

Without limiting the scope of the invention, its background is described in connection with transferring information from a mobile station or Base Station Subsystem (BSS) in a GSM communications network transparently to a Post Processing Subsystem outside the network, as an example.

Present-day mobile telephony has spurred rapid technological advances in both wireless and non-wireless areas. The communications industry is a rapidly growing industry, with advances, improvements, and technological breakthroughs occurring on an almost daily basis. Many mobile communications systems, among them the European GSM-system, have already passed through several basic development phases, and system designers are now concentrating on further improvements to the systems, including system refinements and the introduction of optional services.

In the mobile GSM-system, as well as in other wireless systems, there are an increasing number of user applications which are realized in nodes outside the traditional GSM-system switching architecture. Such user applications include external Unstructured Supplemental Services Data (USSD), mobile positioning, Wireless Application Protocol (WAP) and Intelligent Network (IN) based systems, as well as post processing systems for task or account-based charging. The data related to such applications are of interest to the nodes generating the data and the nodes which process the data. The nodes generating the data may include the Mobile Station (MS), the Base Station Controller (BSC) or the Base Transceiver Station (BTS), which combine to make the Base Station Subsystem (BSS) of the network. As such, the nodes processing the data may include Post Processing equipment (e.g., Post Processing Subsystem) or Emergency (E911) equipment which can process subscriber location information.

In utilizing these user applications, typically, information is sent from a BSC to an external node (e.g., post processing subsystem). By way of the BSC, the information is processed upon reaching the Mobile Switching Center (MSC). The MSC then determines the destination of the information to be delivered to an external node. Such information is routed to its destination via Base Station System Management Application Sub-part (BSSMAP) across a link known as the A-interface. The GSM network thus utilizes the BSSMAP to transfer messages between the BSS and the MSC.

Presently, the USSD mechanism is utilized in communicating outside the network directly. That is, the USSD allows information to be sent transparently through the system to an external USSD handler, or serving system that is not a post processing element. In order for the information to be sent, however, the transaction must be specifically set up requiring an overhead protocol. This transfer mechanism is also utilized for receipt of information resulting in additional overhead and use of mass capacity. Such methods of transferring information to post processing systems outside the network create overhead and result in inefficient use of network resources.

As such, there is a need for a means of sending information from a MS, BSC or BTS or other network entity to a post processing system outside the network that overcomes the overhead disadvantages of USSD. A means of facilitating the transfer of information directly from an element in the network to a system outside the network such as billing systems and/or positioning algorithms would provide numerous advantages.

SUMMARY OF THE INVENTION

The present invention provides a method of transferring information from a Mobile Station (MS), Base Station Controller (BSC), or Base Transceiver Station (BTS) in a wireless communications network transparently to a Post Processing Subsystem (PPSS) outside the network. With the present invention, a direct application is configured to support the handling of Post Processing Transparent Information (PPTI) for Mobile Satellite Applications (MSA), for example, where the information is received from the MS using a BSSMAP container mechanism for transparently transmitting information from the MS to a PPSS outside the network. Such information is sent in response to a request initiated, for example, by the PPSS. With the present invention positioning information about an MS can be gathered via a Global Positioning System (GPS) and transmitted transparently in an ISDN User Part (ISUP) protocol to an emergency or E911 center. This is facilitated by the use of a container mechanism which is adapted to carry such information in a protocol such as ISUP or Access Transport Protocol (ATP). Thus, information is generated and transmitted either periodically, or voluntarily to the PPSS without initiating a request by the PPSS. In this way, an application which is utilized in transferring accounting information provided by the MS user can be sent to the Post Processing node containing the charging record with minimal overhead.

Disclosed in one embodiment is a method of transferring information from a MS or BSS in the network transparently to a PPSS outside the network. The method comprising the steps of requesting information from the MS or BSS by transmitting a request to the network. In one embodiment, the request is made by the PPSS and transmitted via an external node coupling the PPSS to the network. The request can be initiated by the PPSS or voluntarily received from an element in the network by way of the external node. The MS or BSS generates the information about the MS and transmits it to PPSS either in response to the request or voluntarily without processing via a BSSMAP message stream.

The method also comprises the step of an intermediate element in the network (e.g., MSC, VLR) identifying the type of external node from which the request or information was received. Once the external node has been identified, the information from the MS that is either responsive to the request, or voluntarily transmitted is collected. The content of the information is then formatted by an element in the network in a format suitable for receipt by the PPSS. The step of formatting can be performed by tagging the information with a value or name associated with the PPSS in preparation for transmission.

The method further comprises the step of transmitting the information in a network message format to the PPSS through the identified external node from which the request or information was received.

In another embodiment of the present invention disclosed is a method of transferring information from a mobile station in the network transparently to a PPSS outside the wireless or non-terresterial network. The method comprises the step of requesting information from one or more mobile stations by transmitting a request to the network via an external node providing an interface between the PPSS and an element in the network. The method also comprises the step of identifying the external node coupling the PPSS to one or more network elements utilizing a MSC/VLR Switching node in the network. The identified external node can include both a receiving node and a destination node.

The method further comprises the step of an element in the network receiving the request from the PPSS via the receiving node previously identified. Once the request has been received, information is collected from the mobile station that is responsive to the request. The collected information is then sent from the MS to the BSS. Accordingly, the information sent is then forwarded to the Switching System (SS).

The method can also comprise the step of encapsulating the information collected for the PPSS within a BSSMAP message stream. This is performed by transmitting an octet string field coded for transparent transmission. The octet field string can comprise the following identifiers: an ELEMENT INDICATOR octet; a LENGTH INDICATOR octet; and POST PROCESSING INFORMATION octets.

The method can further comprise the step of transmitting the BSSMAP message stream to the identified external node, or destination node. The external node is adapted to connect the content of the BSSMAP message stream into a format suitable for receipt by the PPSS. This includes tagging the information with a value or name associated with the PPSS. Once formatted and tagged, the information is then transmitted to the PPSS via the external node.

Technical advantages of the present invention include an application which is easier to implement, allows for communications between user and processing entity providing services, causes less overhead and uses less capacity.

BRIEF DESCRIPTION OF THE DRAWINGS

For a more complete understanding of the present invention, including its features and advantages, reference is now made to the following detailed description of the invention, taken in conjunction with the accompanying drawings in which:

FIGS. 3a–c illustrate the Post Processing Transparent Information element with respect to the method of transferring information about a mobile station in the wireless communications network transparently to a post processing subsystem outside the network;

Corresponding numerals and symbols in the figures refer to corresponding parts in the detailed description unless otherwise indicated.

DETAILED DESCRIPTION OF PREFERRED EMBODIMENTS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
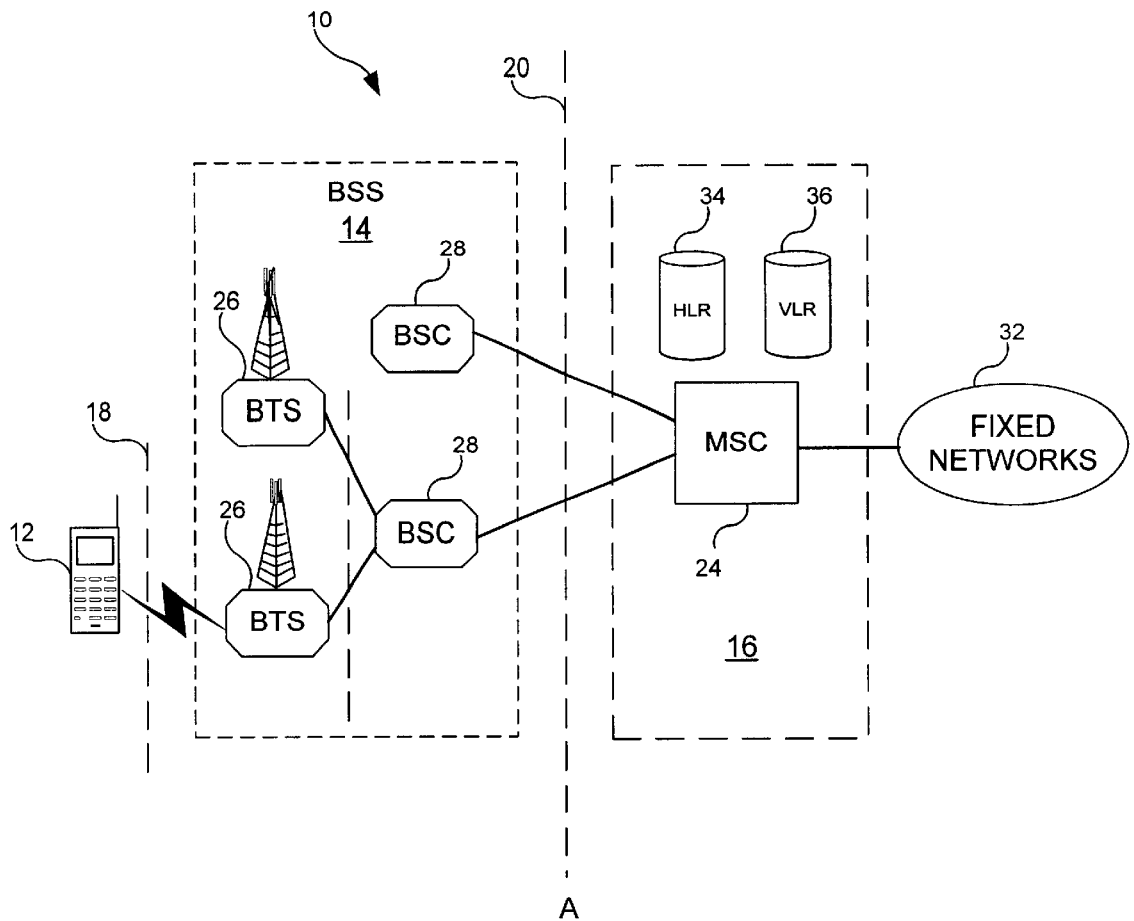
FIG. 1 shows the typical layout of the GSM network with regard to prior art.

FIG. 1 shows the typical layout of a GSM network 10 having three main parts; a Mobile Station (MS) 12, a Base Station Subsystem (BSS) 14, and a network subsystem 16. The network subsystem 16 is commonly referred to as a Switching System (SS). The MS 12 is typically a cellular telephone that is carried by the subscriber. The terms cellular telephone, mobile, mobile station and mobile radio may be used interchangeably to describer the MS 12. The network subsystem 16 includes a Mobile Switching Center (MSC) 24 that performs the call switching functions between network users, as well as mobility management. The MS 12 and the BSS 14 communicate with one another across an interface 18, known as the air interface (or radio link, or Um interface). Furthermore, the BSS 14 communicates with the MSC 24 of network subsystem 16 across an A-interface 20. Likewise, MSC 24 communicates with fixed networks 32 which may be the Public Switched Telephone Network (PSTN) or other cellular networks, for example.

The BSS 14 typically comprises two parts: the Base Transceiver Station (BTS) 26 (commonly called a base station) and the Base Station Controller (BSC) 28. BTS 26 provides cellular coverage via a radio frequency (RF) link to the MS 12 and other mobile stations within the cells of the network 10. Typically, several base stations 26 service a single MSC 24 through BSCs 28 to provide continuous geographical coverage.

BTS 26 communicates across a standardized A-interface 20 with the BSC 28, allowing the operation between components. In particular, BTS 26 houses radio transceivers that communicate across a cell, and handles the radio link protocols that facilitate communication with the MS 12. BSC 28 manages the radio resources for one or more BTSs 26, and, likewise, there may be several BSCs 28 within a single BSS 14. BSC 28 provides a communications platform between the MS 12 and the MSC 24 of network subsystem 16 which acts as an interface to one or more fixed networks 32. Among the functions of the BSC 28 are radio-channel setup, frequency hopping, and handovers.

The central component of the network subsystem 16 is the MSC 24, which mirrors the performance of a normal switching node of the PSTN, and provides all the functionality needed to handle mobile subscriber communications, such as registration, authentication, location updating, handovers and call routing to roaming subscribers. These functions are provided in conjunction with several other network entities.

The MSC 24 provides the connection mechanism to the fixed networks 32 which may include the PSTN or an Integrated Service Digital Network (ISDN), for example. The Home Location Register (HLR) 34 and Visitor Location Register (VLR) 36, together with the MSC 24, provide call routing and roaming capabilities for the GSM network 10. In particular, the HLR 34 contains administrative information of the subscriber registered in the corresponding GSM network 10, along with the current location of the MS 12. Likewise, the VLR 36 contains selected administrative information from a MS's HLR 34 necessary for call control and provisioning of the subscriber services for each mobile currently located in the geographical area controlled by the VLR 36. Other registers are used for authentication and security functions within the network subsystem 16.

Figure 2:
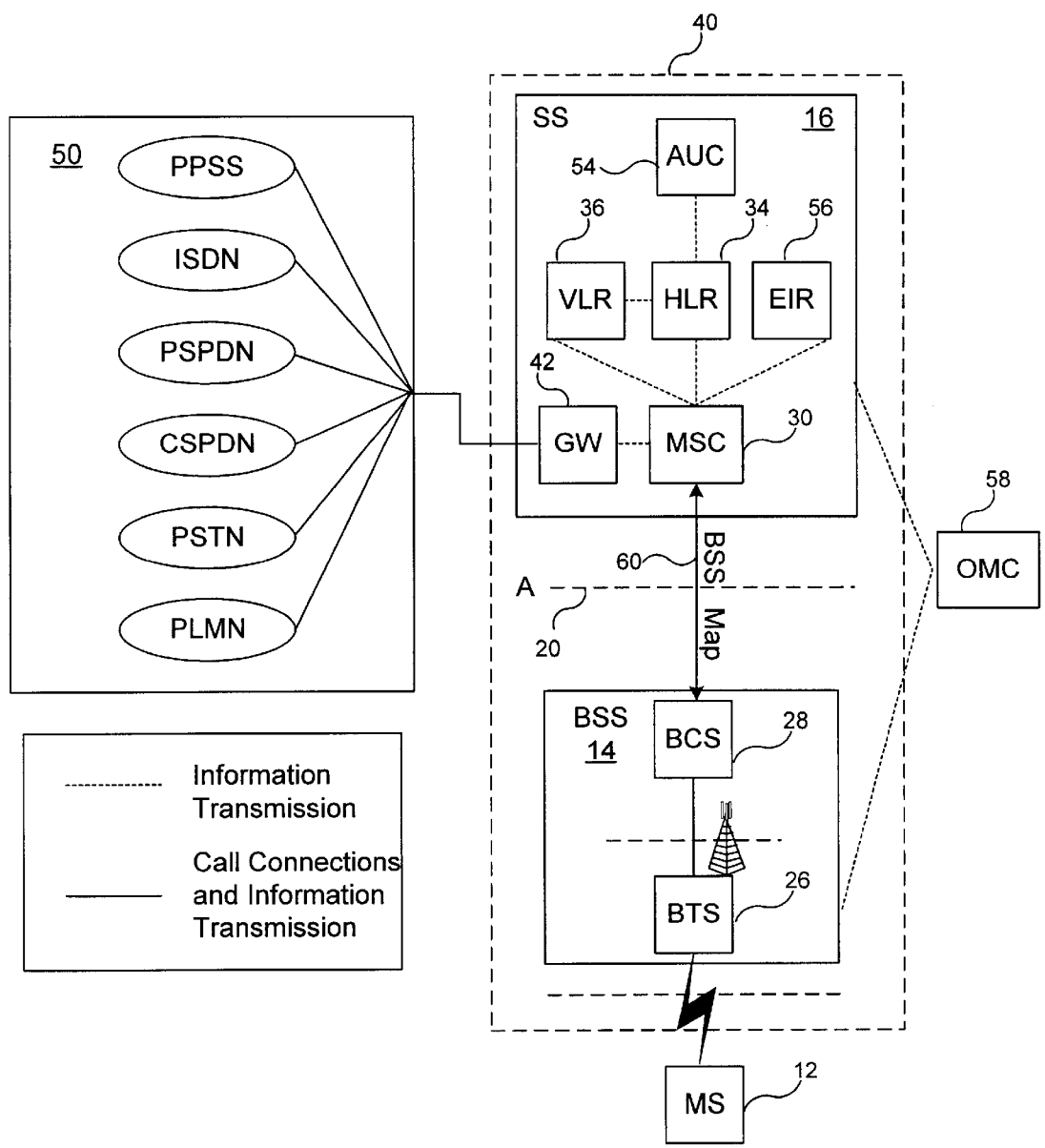
FIG. 2 depicts a telecommunications network in which a preferred embodiment of the present invention may be implemented.

To better understand the invention, reference is made to FIG. 2, wherein a diagram of a telecommunications network, denoted generally as 40, in which a preferred embodiment of the present invention may be implemented is shown. Telecommunications network 40 includes a SS 16 and a BSS 14. Each of these systems contains a number of functional units, which process information and carry out operations of a functional telecommunications network 40. The functional units themselves may be implemented utilizing various telecommunications hardware devices.

The SS 16 includes a VLR 36, a HLR 34, an Authentication Center (AUC) 54, an Equipment Identity Register (EIR) 56, and a MSC 30. The BSS 14 comprises a BSC 28 and a BTS 26. An Operations and Maintenance Center (OMC) 58 is connected to equipment present within SS 16 and to BSC 28. The AUC 54 is connected to HLR 34, and provides HLR 34 with authentication parameters and ciphering keys utilized for security purposes. Also, the dashed lines in FIG. 2 represent information transmission, while solid lines represent both call connections and information transmission.

Each BSC 28 controls a group of BTSs 26. The BSC 28 controls well-known telecommunications functions, such as "Handover" and power control. A number of BSCs (e.g., BSC 28) are served by a MSC 30, which controls calls to and from an external component 50. External component 50 may include, but is not limited to, a Public Switched Telephone Network (PSTN), an Integrated Services Digital Network (ISDN), a Public Land Mobile Network (PLMN), a Circuit Switched Public Data Network (CSPDN), a Post Processing Subsystem (PPSS), and also, various private networks such as a Packet Switched Public Data Network (PSPDN). The present invention will be discussed with respect to the PPSS as an external component 50, but is not a limiting feature of the present invention. As such, the PPSS 50 is the entity which does the processing and is used to provide services to the MS 12 subscriber, such as providing positioning information for one or more MS 12 in the network service area.

The present invention uses a container mechanism which exists in the BSSMAP interface 60. As such, the BSSMAP interface 60 carries information to and from the BSS 14 and the MSC 30. Within the container mechanism of the BSS-MAP interface 60, a specific element is created and adapted to transmit post processing information. In one embodiment, the PPSS 50 requests information from the MS 12. That is, the PPSS 50 transmits a request to the network 40 via an external node, or gateway 42 coupling the PPSS 50 to the network. The gateway 42 provides an interface to the requesting agent, or PPSS 50, and provides the nodes required for transmission of the post processing information.

The receiving node recognizes the information elements destined for other nodes (such as the Post Processing Node). The destination node is recognized by name of the information or a tag value. The receiving node transports the element to the destination node in the next available protocol transaction, as a piggy back container information.

Once the request has been sent, an element in the network receives the request from the PPSS 50 via a receiving node by way of the gateway 42. From the perspective of the network, the PPSS 50 comprises a node which must be identified by an intermediate element, such as the MSC 30 and VLR 36, as the external node from which the request was received. In doing so, the destination node is identified for routing. Therefore, the processing function of the MSC 30 is bypassed resulting in minimal overhead and less capacity use.

After identifying the requesting nodes, the information about the MS 12 that is responsive to the request is collected. The content of the information is then placed in a container element and in a format suitable for receipt by the PPSS 50. This allows for the information to be tagged with a value or name associated with the PPSS 50 for identification purposes. The information is then transmitted in a network message format to the PPSS 50 through the identified external node from which the request was received.

In transmitting the information, it is specifically placed in the container mechanism found in BSSMAP interface 60. That is, it is put into the post processing container which is has been specifically created and adapted to carry the post processing element. In doing so, the information is sent with a BSSMAP 60 message. This process allows for an intermediate entity (e.g., MSC 30, VLR 36) to intercept the container and determine its destination using network supported messaging standards and protocols. As such, the BSSMAP interface 60 allows for transmission of information between the MSC 30 and the BSS 14 across an A-interface 20 in a transparent way. The MSC 30 no longer has to process the information. Instead, it knows where the request is coming from (e.g., PPSS 50), where the request is going (e.g., MS 12), where the information is coming from (e.g., MS 12) and where the information is destined to go (e.g., PPSS 50). The information, thus, is carried transparently through the MSC 30 and VLR 36 to an external node (e.g., PPSS 50).

In another embodiment, information pertaining to the MS 12 is generated by the MS 12 or BSS 14 voluntarily. That is, the information (e.g., positioning of the MS 12, for example) is transmitted via an external node 42 periodically to the PPSS 50 without an initiated request by the PPSS 50. The generated information is then received by the MSC 30 without processing via a BSSMAP interface 60 message stream. Once the information is received by the MSC 30, the process is the same. That is, the information received is collected; the external nodes 42 are identified; the information content is formatted; and the formatted information is transmitted to the PPSS 50.

The telecommunications network 40 depicted in FIG. 2 may be implemented as a GSM-type network. Those skilled in the art can appreciate that although the present invention is described and illustrated in the context of a GSM network, the present invention may also be implemented in accordance with other standards and networks, including AMPS/ TMDA utilized in North and South America. The GSM network, as discussed herein, is merely presented for illustrative purposes only and is not a limiting feature of the present invention.

In order for the information to be carried transparently through the MSC 30 and VLR 36 to the PPSS 50, an information element, or Post Processing Transparent Information (PPTI) element must be included. With reference to FIGS. 3a–c, therein is shown the PPTI element, denoted generally as 70, with respect to the method of the present invention for transferring information from a MS 12 in the network 40 transparently to the PPSS 50 outside the network 40.

The PPTI element 70 includes the requested information within a BSSMAP interface 60 message stream. This is accomplished by transmitting an octet string field coded for transparent transmission of the information. The PPTI element 70 can be coded as shown in FIG. 3a. The BSSMAP interface 60 message stream should include on octet for the ELEMENT IDENTIFIER, an octet for the LENGTH INDICATOR, and octets set aside for the post processing information. This data selectively placed in the various octets is then used by the Intermediate element (e.g., MSC 30) of the network 40 to determine its receiving and destination nodes. The MSC/VLR, 30 and 36 respectively, are then equipped to receive this information element 70 from the BSC 28 in a BSSMAP interface 60 message such as ASSIGNMENT COMPLETE or COMPLETE LAYER 3 INFORMATION.

One application of the present invention is a Billing Indicator (BI) which is an Information Element (IE) that provides subscriber position information that is interesting only to the PPSS 50. The BSC 28 generates the BI. MSC/VLR, 30 and 36 respectively, is required to receive the BI information element via the A-interface 20 container and pass this information element transparently to the PPSS 50 using the Charging Data Record (CDR). BI will be received in ASSIGNMENT COMPLETE and COMPLETE LAYER 3 messages for originating and terminating calls.

The BI can be a 16 bit value which will be received as Network Specific RR info in the A-interface 20 as part of the PPTI element 70. This information element 70 will be coded in a format shown in FIG. 3b. As shown, octet 1 and octet 2 are reserved for ELEMENT IDENTIFIER and LENGTH INDICATOR, respectively. Octet 3 and Octet 4 carry information such as Service Provider (SP) Region ID and Benefit of Doubt (BOD) Region ID, respectively. SP Region ID identifies the service provider who controls the location from where the subscriber is placing or receiving the call. The BOD Region ID identifies the geographical regions where it is not possible to precisely determine the location where the subscriber is located. The BOD Region can be used in the post processing charging analysis to ensure that the subscribers are not over-charged if the location of the subscriber cannot be determined accurately.

As previously discussed, information transported to the PPSS 50 transparently through the MSC/VLR, 30 and 36 respectively, is tagged with a value or name associated with the PPSS 50. With respect to the PPTI element 70, a Tag Data Identifier is being defined as ASN.1 for BI. This identifier is coded as shown in FIG. 3c. As indicated, Octet 1 includes the SR Region ID and Octet 2 contains BOD Region ID. Therefore, using the coded PPTI element 70 and the octet string identifiers via the BSSMAP interface 60 message stream, the MSC/VLR 30,36 receives the PPTI element 70 in the A-interface 20 container in BSSAP messages. BSSAP includes both BSSMAP interface 60 message stream, as well as DTAP. The MSC/VLR 30, 36 includes the PPTI element 70 information in the Call Data Record (CDR) with a suitable ASN.1 tag when received in the A-interface 20 container. CDR is then transported to PPSS 50.

Figure 4A:
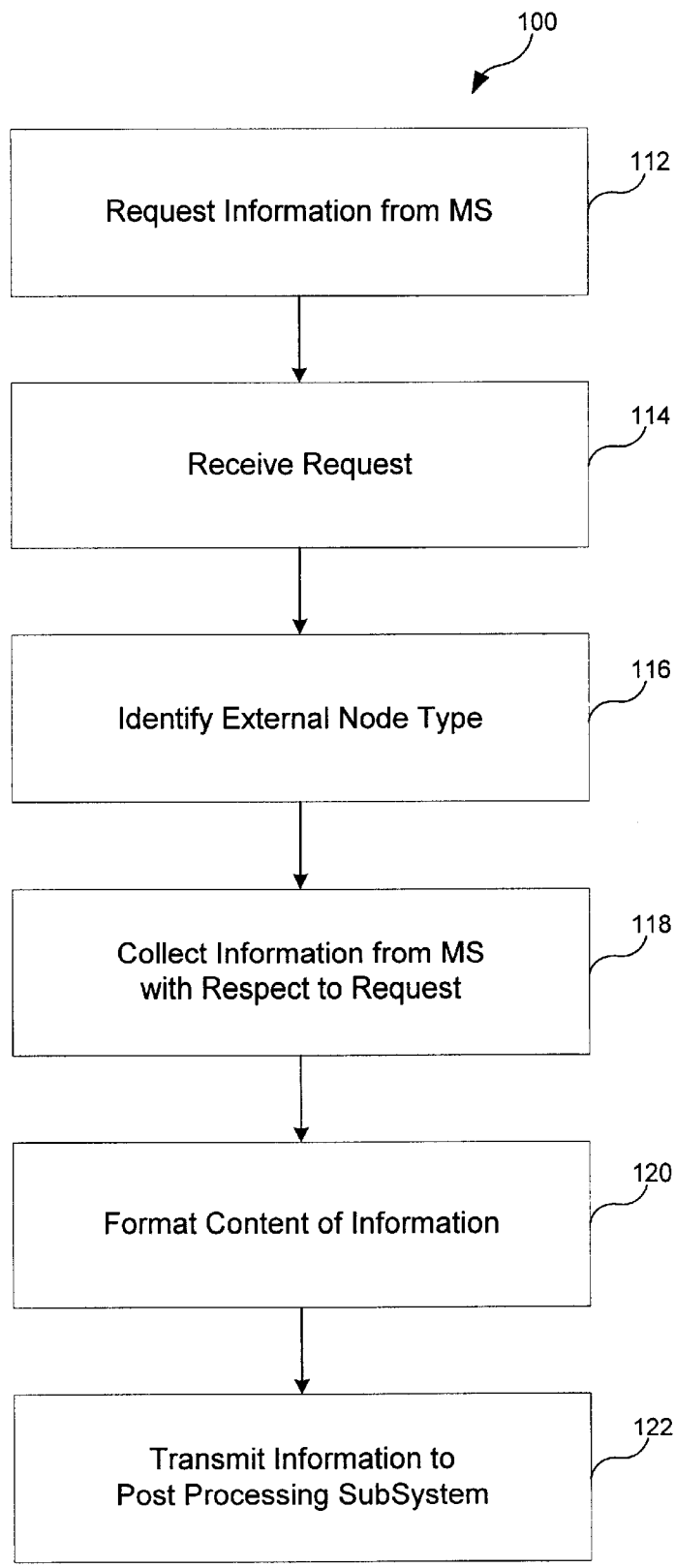
FIG. 4a is flow diagram illustrating process steps for implementing the method and system of the present invention, in accordance with one embodiment.

With reference to FIG. 4a, therein is shown a process flow diagram, denoted generally as 100, for a method of transferring information from a MS 12 in the wireless communications network 40 transparently to a PPSS 50 outside the network 40, according to one embodiment of the present invention. Initially, the PPSS 50 requests information at step 12 from the MS 12 by transmitting a request to the network 40 via an external node or gateway 42 coupling the PPSS 50 to the network 40. An element in the network 40 then receives the request at step 114 from the PPSS 50 via a receiving node 42. Once the request is received, the type of external node 42 from which the request was received is then identified at step 116 by an intermediate PPSS element in the network 40.

As noted at step 112, information from the MS 12 is requested. As a result, information from the MS 12 with respect to the request is collected at step 118. The content of the information is then formatted by the element in the network 40 at step 120 into a format suitable for receipt by the PPSS 50. In formatting the information, the information is tagged with a name or value associated with the PPSS 50. This allows the MSC/VLR, 30 and 36 respectively, to identify the receiving and destination nodes 42 in order to transmit the information transparently to the PPSS 50 without performing its normal processing functions.

Once the information has been formatted at step 120, the requested information is then transmitted at step 122 in a network message format to the PPSS 50 through the identified external node 42 from which the request was received.

Figure 4B:
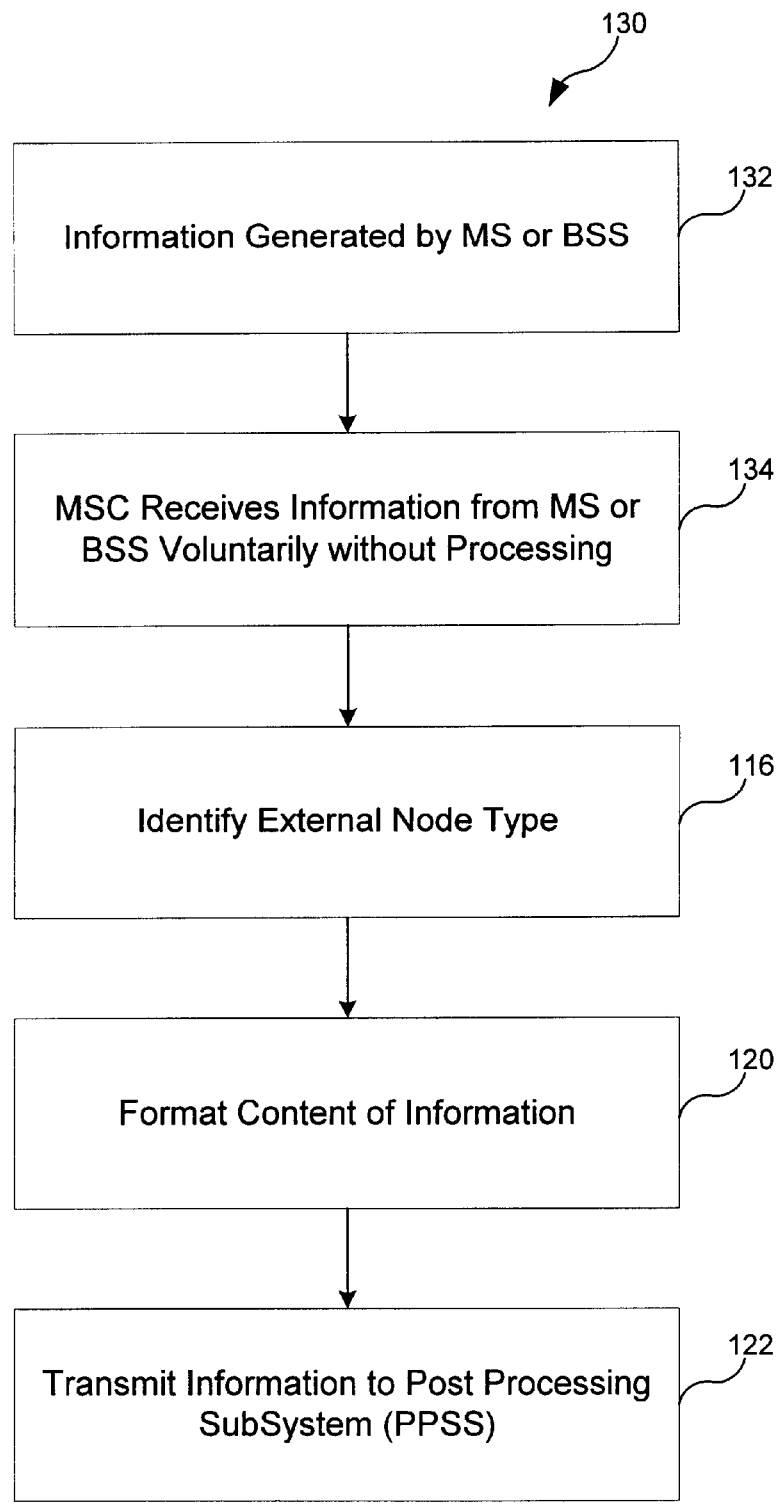
FIG. 4b is a flow diagram illustrating process steps for implementing the method and system of the present invention, in accordance with an alternative embodiment.

With reference to FIG. 4b, therein is shown a process flow diagram, denoted generally as 130, for a method of transferring information from a MS 12 in the wireless communications network 40 transparently to a PPSS 50 outside the network 40, according to another embodiment of the present invention. Initially, information pertaining to the MS 12 is generated at step 132 by the MS 12 or BSS 14. Such information may include positioning and/or location of the MS 12 subscriber for emergency (E911) purposes and/or billing inquiries. As such, the information may be generated periodically, for example, in order to keep the associated PPSS 50 updated.

This information is then received by the MSC 30 at step 134 from the MS 12 or BSS 14 voluntarily without processing via a BSSMAP interface 60 message stream. Base on the type of information being generated by the MS 12 or BSS 14, the external node or gateway 42 coupling the PPSS 50 to the network 40 to which the information is to be transmitted is identified at step 116. This provides the signal pathway, or communication means, between the PPSS 50 and the MSC 30 for transmitting the necessary information.

The information is then collected and analyzed for determining what information content needs to be sent to the PPSS 50. Once this determination has been made, the content of the information is then formatted at step 120 by an element in the network 40 into a format suitable for receipt by the PPSS 50. Formatting the information at step 120 further includes tagging the information with a value or name associated with the PPSS 50. This allows the MSC/VLR, 30 and 36 respectively, to identify the destination node 42 which will be utilized in transmitting the information at step 122 to the PPSS 50 without performing its normal processing functions.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. Within a wireless telecommunications network, a method of transferring information from a mobile station or base station subsystem in the network transparently to a post processing subsystem outside the network, the method comprising the steps of:

generating said information by the mobile station or base station subsystem;

receiving by a the mobile switching center, said information from the mobile station or base station subsystem voluntarily without processing via a Base Station Subsystem Management Application Part (BSSMAP) message stream;

identifying the type of external node from which a request for information was received;

an element in the network formatting the content of the information in a format suitable for receipt by the post processing subsystem; and an element in the network transmitting the information in a network message format to the post processing subsystem through the identified external node from which the request or information was received.

2. Within a wireless telecommunications network, a method of transferring network-related information from a base station subsystem (BSS) in the network transparently to a post processing subsystem outside the network, the method comprising the steps of:

requesting, by the post processing subsystem, the network-related information from the BSS by transmitting a request to the network via an external node coupling the post processing subsystem to the network;

sending the requested network-related information from the BSS to an intermediate element in the network voluntarily without processing via a Base Station Subsystem Management Application Part (BSSMAP) message stream;

said intermediate element:
identifying the external node through which the request for information was received;
formatting the requested network-related information in a format suitable for receipt by the post processing subsystem; and
transmitting the information in a network message format to the post processing subsystem through the identified external node from which the request for information was received.

3. The method according to claim 1 wherein said formatting step further comprises the step of tagging said information with an identifier associated with the post processing subsystem.

4. The method according to claim 2 wherein said sending step is preceded by the step of the BSS generating said information.

5. The method according to claim 2 wherein said identifying step is performed by a Mobile Switching Center/Visitor Location Register (MSC/VLR) in the network.

6. The method according to claim 2 wherein said step of formatting the requested network-related information in a format suitable for receipt by the post processing subsystem includes encapsulating information collected for the post processing subsystem within a Base Station Subsystem Management Application Part (BSSMAP) message stream by transmitting an octet string coded for transparent transmission, and the step of transmitting the information through the identified external node includes transmitting the BSSMAP message stream to the identified external node.

7. The method according to claim 6 wherein said octet string field comprises an ELEMENT IDENTIFIER octet.

8. The method according to claim 6 wherein said octet string field comprises a LENGTH INDICATOR octet.

9. The method according to claim 6 wherein said octet string field comprises POST PROCESSING INFORMATION octets.

10. The method according to claim 2 wherein said formatting step includes the step of tagging said information with an identifier associated with the post processing subsystem.

11. Within a wireless telecommunications network, a system for transferring information from a mobile station or base station subsystem in the network transparently to a post processing subsystem outside the network, the system comprising:

means for identifying a type of external node from which a request for information was received, said identifying means including:
means for generating said information; and
means for receiving said information from the mobile station or base station subsystem voluntarily without processing via a Base Station Subsystem Management Application Part (BSSMAP) message stream;
means for formatting the content of the information in a format suitable for receipt by the post processing subsystem; and
means for transmitting the information in a network message format to the post processing subsystem by way of the external node.

12. The system according to claim 11 wherein said means for identifying includes means for requesting information from the mobile station or base station subsystem configured to transmit a request from the post processing subsystem to the network via an external node coupling the post processing subsystem to the network.

13. The system according to claim 12 wherein said means for requesting includes means for receiving the request from the post processing subsystem via said receiving node.

14. The system according to claim 11 wherein said means for identifying includes means for collecting information configured to be responsive to the request.

15. The system according to claim 11 wherein said means for formatting includes means for tagging said information with a value or name associated with the post processing subsystem.

16. The system according to claim 11 wherein said base station subsystem includes a base transceiver station and a base station controller.

* * * * *